United States Patent
Bach (10) Patent No.: US 11,522,409 B2
(45) Date of Patent: Dec. 6, 2022

(54) SHAFT, ROTOR LAMINATION AND ROTOR FOR AN ELECTRIC MACHINE, ELECTRIC MACHINE, VEHICLE, AND METHOD FOR PRODUCING A ROTOR

(71) Applicant: VALEO SIEMENS EAUTOMOTIVE GERMANY GMBH, Erlangen (DE)

(72) Inventor: Regina Bach, Hendungen (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 188 days.

(21) Appl. No.: 17/003,030

(22) Filed: Aug. 26, 2020

(65) Prior Publication Data
US 2021/0066997 A1    Mar. 4, 2021

(30) Foreign Application Priority Data
Aug. 28, 2019    (DE) .................... 10 2019 123 032.2

(51) Int. Cl.
  *H02K 1/24*    (2006.01)
  *H02K 7/00*    (2006.01)
  *H02K 15/02*   (2006.01)
  *B21D 28/22*   (2006.01)

(52) U.S. Cl.
  CPC .............. *H02K 7/003* (2013.01); *H02K 1/24* (2013.01); *H02K 7/006* (2013.01); *H02K 15/02* (2013.01); *B21D 28/22* (2013.01); *H02K 2213/03* (2013.01)

(58) Field of Classification Search
  CPC .......... B21D 28/22; H02K 1/24; H02K 7/006; H02K 15/02; H02K 2213/03
  USPC .......................................... 310/75 r
  See application file for complete search history.

(56) References Cited

U.S. PATENT DOCUMENTS

2015/0069879 A1*  3/2015  Papini .................... H02K 1/30
                                                      29/598

FOREIGN PATENT DOCUMENTS

| DE | 102017001987 A1 | 10/2017 | |
| DE | 102016216476 A1 | 3/2018 | |
| FR | 3046306 A1 * | 6/2017 | ............... H02K 1/28 |
| JP | 5945485 B2 * | 7/2016 | ............. Y02T 10/64 |

OTHER PUBLICATIONS

Norm DIN 32711 1979.03-00; Antriebselemente; Polygonprofile P3G; pp. 1 to 3.
Norm DIN 32712 1979.03-00; Antriebselemente; Polygonprofile P4C; pp. 1 to 3.

* cited by examiner

*Primary Examiner* — Terrance L Kenerly
(74) *Attorney, Agent, or Firm* — Manabu Kanesaka (57) ABSTRACT

Shaft for an electric machine, includes a core seat for a laminated core and two shaft ends extending axially outwardly from the core seat in opposite directions, wherein the core seat has at least one core seat portion extending in the axial direction with a polygonal profile for forming a polygonal connection to the laminated core.

12 Claims, 6 Drawing Sheets

SHAFT, ROTOR LAMINATION AND ROTOR FOR AN ELECTRIC MACHINE, ELECTRIC MACHINE, VEHICLE, AND METHOD FOR PRODUCING A ROTOR

RELATED APPLICATIONS

The present application is based on, and claims priority from, German Application No. DE 10 2019 123 032.2 filed Aug. 28, 2019, the disclosure of which is hereby incorporated by reference herein in its entirety.

The present invention relates to a shaft for an electric machine, comprising a core seat for a laminated core and two shaft ends extending axially outwardly from the core seat in opposite directions.

In addition, the invention relates to a rotor lamination for an electric machine, a rotor for an electric machine, a method for producing a rotor, an electric machine, and a vehicle.

DE 10 2017 001 987 A1 discloses a rotor for an electric machine with a rotor shaft and a laminated core arranged on the rotor shaft, which laminated core is connected to the rotor shaft for conjoint rotation by means of a press fit formed at least in various length regions of the rotor shaft and the laminated core. For this purpose, an external toothing is provided in the length region of the rotor shaft and is engaged by a corresponding internal toothing in the length region of the laminated core.

Such a corresponding toothing is difficult to produce and weakens the mechanical stability of the laminated core, which reduces the transmission of torque to the shaft.

The invention thus aims to achieve the object of providing an improved possibility of connecting a shaft to a laminated core.

According to the invention, the solution to this problem is provided, in the case of a shaft of the type mentioned at the outset, in that the core seat has at least one core seat portion extending in the axial direction with a polygonal profile for forming a polygonal connection to the laminated core.

The invention is based on the consideration of providing the core seat with the polygonal profile, which is advantageously easy to produce and does not cause a laminated core to be applied to be mechanically weakened by means of a toothing or the like. This considerably increases torque transmission between the laminated core and the shaft and improves the mechanical stability of the connection between the shaft and the laminated core.

In the context of the invention, a polygonal profile is not exclusively a polygonal profile with straight sides in the sense of a triangle or a square. Rather, the term also includes the profile of a polygonal connection in the sense of DIN 32711 and DIN 32712. The polygonal profile may therefore be in particular a P3G profile or a P4C profile.

More specifically, in the shaft according to the invention it may be provided that a regular inner N-sided shape with $N \geq 3$ is inscribed in the polygonal profile and the polygonal profile may be inscribed in an outer circle that each corner of the inner N-sided shape touches. The inner N-sided shape may be, for example, an inner triangle, an inner quadrilateral, an inner pentagon or an inner hexagon. Typically, $N \leq 12$, in particular $N \leq 10$, in particular $N \leq 6$.

For an eccentric polygonal profile, it may be provided that an inner circle concentric with the outer circle is inscribed in the polygonal profile and a chord of the inner circle runs along a side of the inner N-sided shape.

The use of a polygonal profile on a shaft for a staggered rotor has proven to be particularly advantageous. For this purpose, it may be provided that the core seat has two core seat portions which are offset from each other in the circumferential direction. In particular, the offset is less than $360° \cdot N^{-1}$. A step may be formed between the core seat portions. The core seat portions are typically directly adjacent to each other.

With regard to the production of a staggered rotor, the offset core seat portions enable a simple production process in which individual laminations are pushed onto one core seat portion from both sides of the shaft, hitting against the other core seat portion because of the step, and thus automatically assuming the correct alignment relative to each other, because the polygonal profile prevents the individual laminations from rotating relative to each other. This is particularly advantageous in comparison to conventional techniques, where correctly oriented laminated cores must first be constructed from individual laminations and then joined to the shaft at the correct angle to each other. The susceptibility of the rotor assembly to errors may thus be reduced.

Typically, a straight line lying on one of the corners in the axial extent of a particular core seat portion is parallel to the central axis of the shaft. In addition, a screw curve which, at a particular core seat portion, touches the corner at a central axial position of the core seat portion may also form an angle with the straight line. This angle may then form the stagger angle.

In the case of the shaft according to the invention, the polygonal profile may be axially inclined.

With such an axially inclined polygonal profile, a continuous angle of inclination of the laminated core may be produced. In particular, this allows narrow tolerances when producing of the angle of inclination, which depend in particular only on the design of the shaft and individual rotor laminations. At the same time, the core seat may be used to guide individual rotor laminations. In comparison to conventional possibilities for producing a continuously tilted rotor, in which the rotor laminations have to be brought into the desired orientation by means of a pre-threading device and then fixed in order to then be provided with the shaft, a rotation of the rotor laminations is advantageously prevented. In this way, the generation of the angle of inclination of the laminated core may be shifted from a pre-threading process to the actual threading process, in which the rotor laminations are brought onto the shaft. In particular, a pre-threading device may be dispensed with, which improves the handling and reduces the time required to produce a rotor.

In particular, it may be provided that one of the corners along the axial extent of the core seat portion lies on a straight line which forms an angle with a straight line parallel to the central axis of the shaft. This angle then forms the angle of inclination.

The problem addressed by the invention is further solved by a rotor lamination for an electric machine, having a central through-opening with a polygonal profile. Typically, the rotor lamination according to the invention has a plurality of further through-openings which are offset in relation to one another in the circumferential direction at a radial position, each through-opening being designed to form a magnet pocket for a permanent magnet.

Typically, the polygonal profile of the rotor lamination is mirror-inverted as compared to that of the shaft described above. In this respect, all embodiments relating to the polygonal profile of the shaft may be transferred to that of the rotor lamination.

The problem addressed by the invention is further solved by a rotor for an electric machine, comprising a shaft according to the invention and a rotor laminated core formed of stacked rotor laminations according to the invention, the central through-openings sitting on the core seat.

The problem addressed by the invention is further solved by a method for producing a rotor according to the invention, wherein the passage openings of each rotor lamination are guided over the core seat.

Particularly with regard to the production of a continuously tilted rotor, it is preferred if the rotor laminations are guided over the core seat by applying an axial force and if a rotation of a rotor lamination is realised by the sliding of an inner contour of the passage opening along an outer contour of the core seat.

Typically, the rotor laminations are shrunk onto the core seat after being guided over the core seat.

All embodiments of the shaft according to the invention may be transferred analogously to the method according to the invention, so that the advantages described above may also be achieved with this method.

The problem addressed by the invention is further solved by an electric machine comprising a rotor according to the invention or a rotor obtained by the method according to the invention, the rotor being rotatably mounted within a stator of the electric machine.

In particular it may be provided that the stator has Z stator teeth and the angle is between $360° \cdot (r-1) \, r^{-1} \cdot Z^{-1}$ and $360° \cdot (r+1) \, r^{-1} \cdot Z^{-1}$, where $r \geq 2$, in particular $r \geq 10$, is a real number.

The electric machine is typically permanently excited or separately excited and/or is a synchronous machine.

In addition, the problem addressed by the invention is solved by a vehicle, comprising an electric machine according to the invention which is designed to drive the vehicle.

Figure 1:
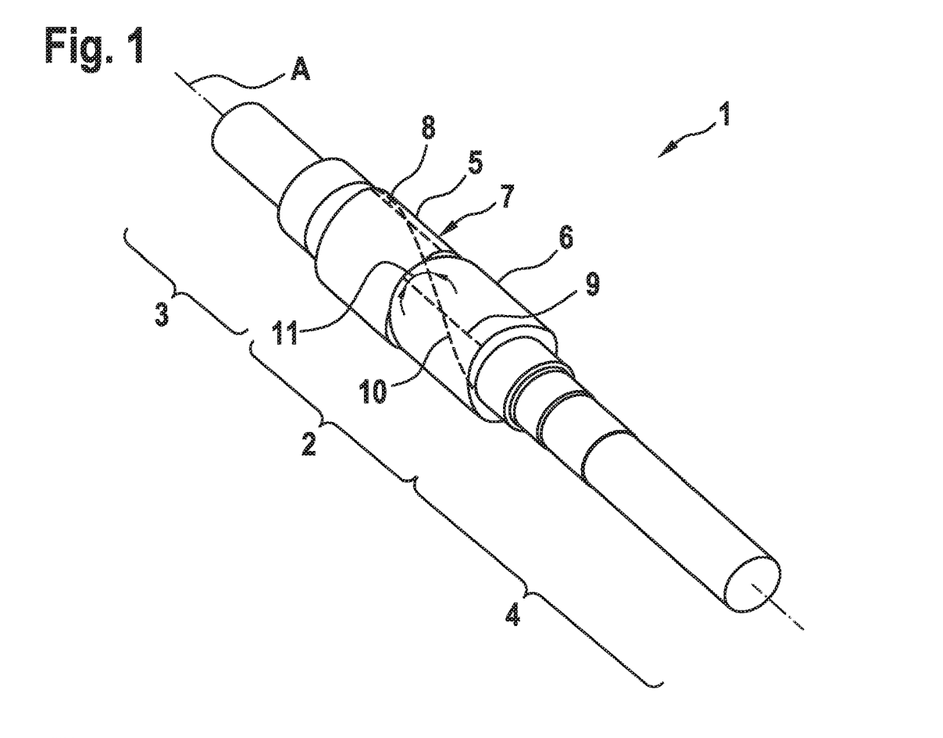
FIGS. 1 and 2 in each case a perspective representation of a first exemplary embodiment of the shaft according to the invention.
Figure 2:
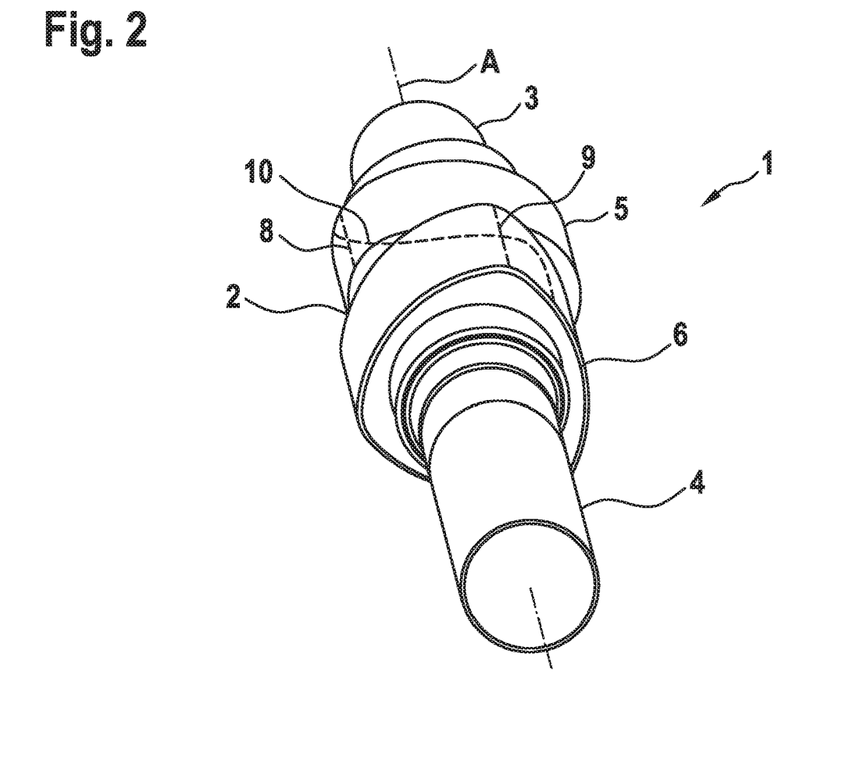

Further advantages and details of the present invention will become clear from the exemplary embodiments described in the following and from the drawings. These are schematic representations and show:

FIG. 1 and FIG. 2 are each a perspective representation of a first exemplary embodiment of a shaft 1.

The shaft 1 has a core seat 2 and two shaft ends 3, 4 extending axially outwardly from the core seat 2 in opposite directions. The shaft end 4 is situated on an output side of the shaft 1.

The core seat 2 comprises a first core seat portion 5 and a second core seat portion 6, each extending in the axial direction and having a polygonal profile. The core seat portions 5, 6 are offset here in relation to each other in the circumferential direction. The polygonal profiles are each P3G profiles according to DIN 32711 and, accordingly, have three eccentric protuberances 7. The polygonal profile extends axially in a straight line along the particular core seat portion 5, 6, so that each protuberance 7 extends along a straight line 8, 9, which runs parallel to a central axis A of the shaft 1. At central axial positions of the core seat portions 5, 6, the straight lines 8, 9 each lie on a screw curve 10 with a constant pitch. The screw curve 10 intersects the straight lines 8, 9 at an angle 11.

Figure 3:
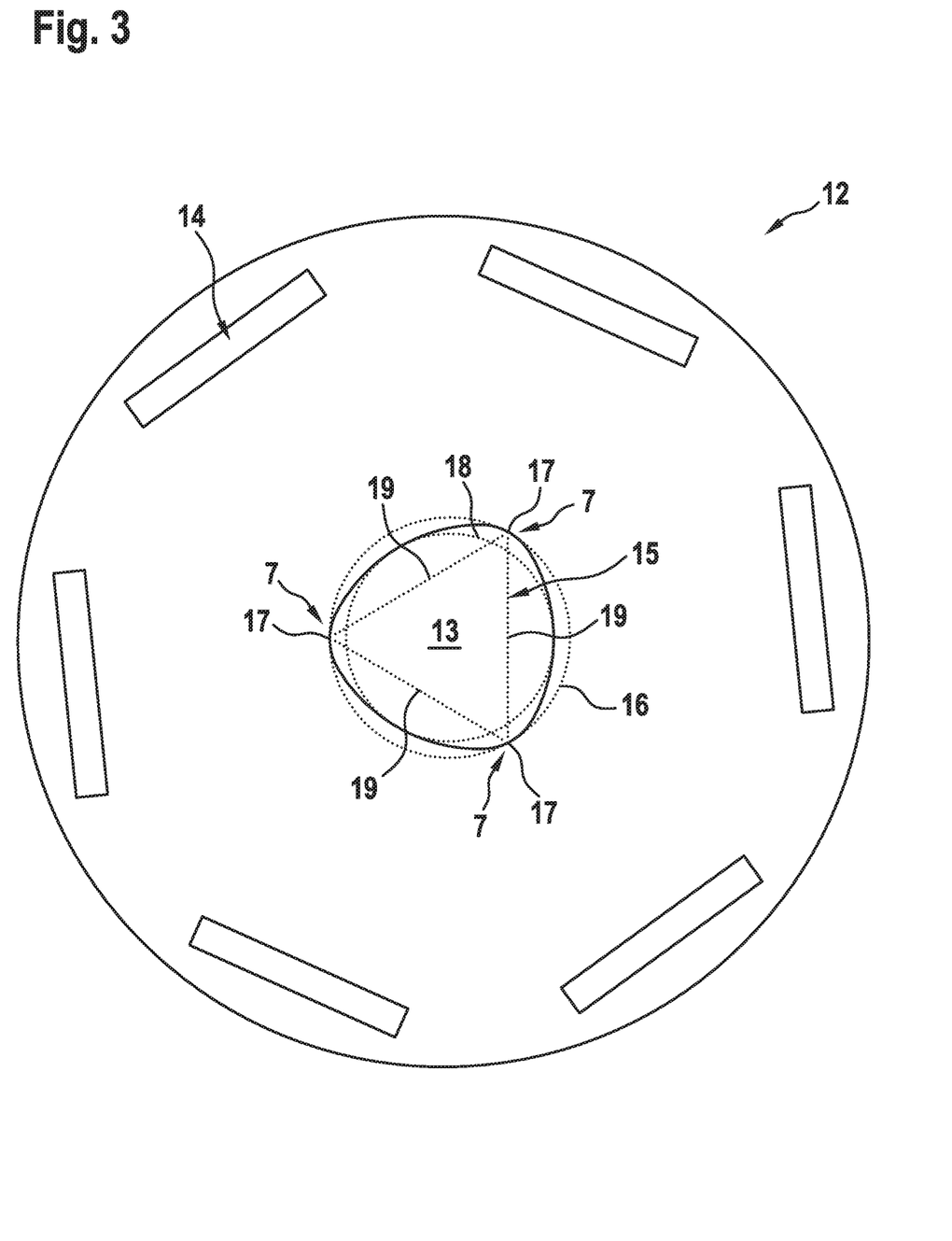
FIG. 3 a basic sketch of an exemplary embodiment of the rotor lamination according to the invention.

FIG. 3 is a basic sketch of an exemplary embodiment of a rotor lamination 12.

The rotor lamination 12 has a central through-hole 13 with a polygonal profile. In addition, the rotor lamination 12 comprises multiple further through-openings 14, which are each located at the same radial position and are equidistantly offset from each other by a fixed angle in the circumferential direction. Each through-opening 14 serves to form a magnet pocket for a permanent magnet when a plurality of rotor laminations 12 are stacked to form a rotor laminated core.

In addition, FIG. 3 shows some geometrical properties of the polygonal profile, which in this respect also apply to the polygonal profile of the first exemplary embodiment of the shaft 1 (see FIGS. 1 and 2). A regular inner triangle 15 is inscribed in the polygonal profile and the polygonal profile itself is inscribed in an outer circle 16 which each corner 17 of the inner triangle 15 touches. The eccentricity of the polygonal profile is due to the fact that an inscribed inner circle 18 is concentric with the outer circle 16 and a chord of the inner circle 18 runs along a side 19 of the inner triangle 15.

Figure 4:
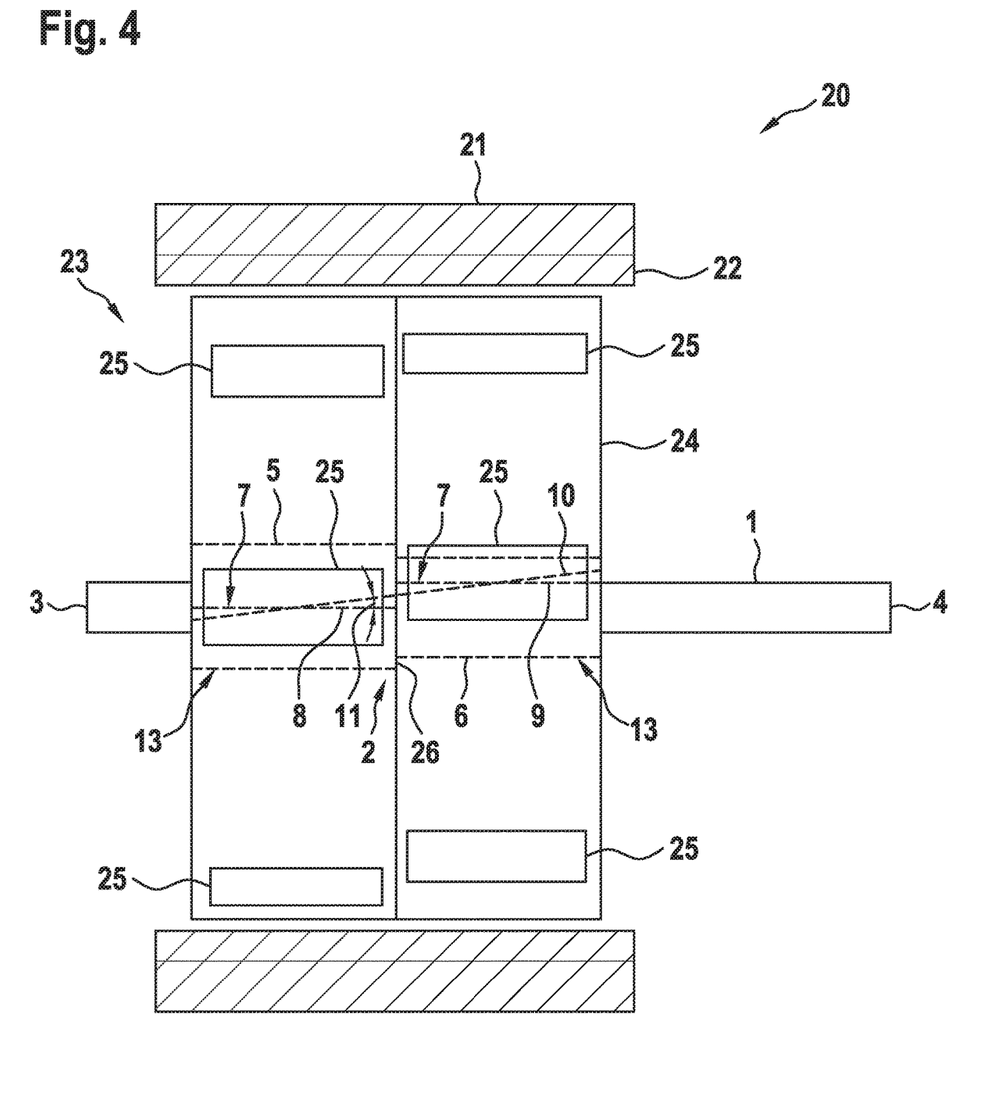
FIG. 4 a basic sketch of a first exemplary embodiment of the electric machine according to the invention with a first exemplary embodiment of the rotor according to the invention.

FIG. 4 is a basic sketch of a first exemplary embodiment of an electric machine 20.

The electric machine 20 is, in the present case, a permanently excited synchronous machine and comprises a stator 21 with a number Z of stator teeth 22.

In addition, the electric machine 20 comprises an exemplary embodiment of a rotor 23. The rotor 23 comprises the first exemplary embodiment of the shaft 1 and a rotor laminated core 24 formed from stacked rotor laminations 12 according to the exemplary embodiment in FIG. 3. In this case, the central through-openings 13 of each rotor lamination 12 sit on a corresponding core seat portion 5, 6. The rotor laminations 12 are stacked congruently to each other so that magnet pockets for permanent magnets 25 of the rotor 23 are formed.

The rotor 23 is therefore a staggered rotor of which the stagger angle corresponds to the angle 11 between the straight line 8 or 9 and the screw curve 10.

According to a first exemplary embodiment of a method for producing the rotor 23 according to FIG. 4, the through-openings 13 of each rotor lamination 12 are guided over the core seat 2. The rotor laminations 12 for the first core seat portion 5 are guided from the shaft end 3 and the rotor laminations 12 for the second core seat portion 6 are guided from the shaft end 4 over the core seat 2, wherein a rotor lamination 12 guided first over the core seat 2 hits against a step 26 formed by the offset between the core seat portions 5, 6. Due to the mirror-inverted polygonal profiles of the core seat portions 5, 6 on the one hand and of the rotor laminations 12 on the other hand, an undesirable rotation of the rotor laminations 12 is thus avoided.

The rotor laminations 12 and the shaft 1 are joined by shrinking. For this purpose, the rotor laminations 12 are heated and/or the shaft 1 is cooled before the rotor laminations 12 are guided over the core seat 2 so that the polygonal profile of the rotor laminations 12 is slightly wider than that of the shaft 1. Then, the temperatures of the shaft 1 and of the rotor laminations 12 are equalised and the rotor laminations 12 are joined to the shaft 1.

Figure 5:
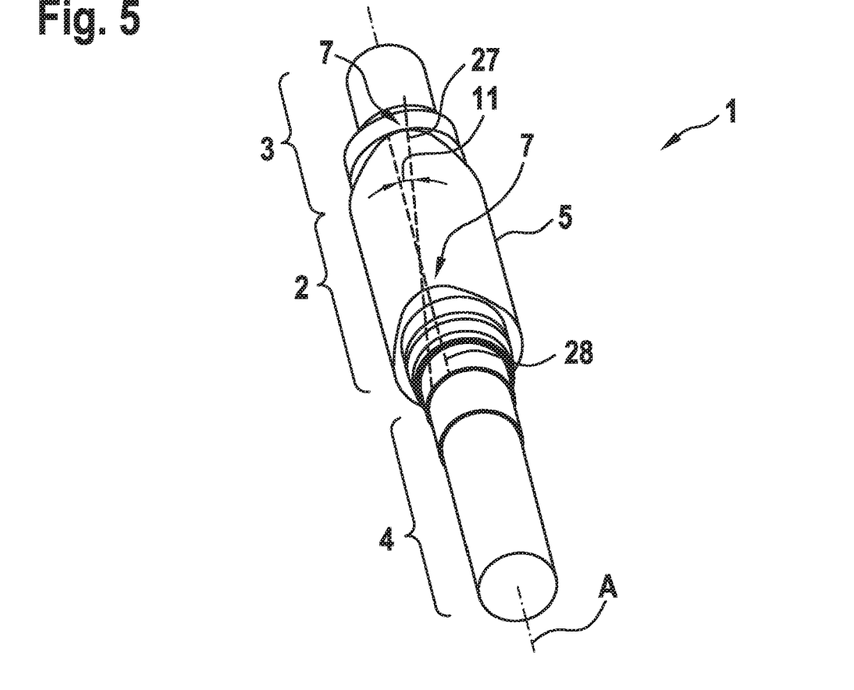
FIGS. 5 and 6 in each case a perspective representation of a second exemplary embodiment of the shaft according to the invention.
Figure 6:
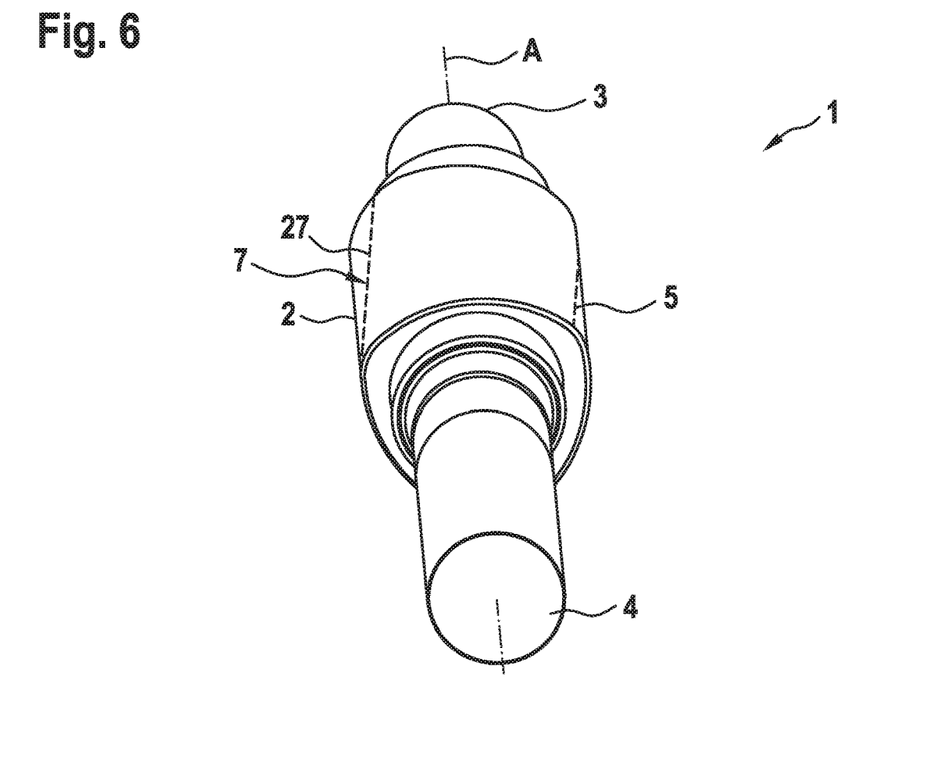

FIG. 5 and FIG. 6 are each a perspective representation of a second exemplary embodiment of a shaft 1, for which all variants of the first exemplary embodiment according to FIG. 1 and FIG. 2 apply analogously, unless otherwise described below. Like or functionally like components are provided with identical reference signs.

The core seat 2 of the shaft 1 is formed by a core seat portion 5 of which the polygonal profile is axially inclined. This means that the positions in the circumferential direction of a protuberance 7 at the end of the core seat 2 pointing towards the shaft end 3 and a protuberance 7 at the end of the core seat 2 pointing towards the shaft end 4 are offset in relation to each other. Accordingly, the axial extent of each corner 17 (see FIG. 3) lies on a straight line 27 which forms an angle 11 with a straight line 28 parallel to the central axis A of the shaft 1.

The geometric variants for the polygonal profile of the rotor lamination 12 in FIG. 3 may be transferred analogously to the polygonal profile of the second exemplary embodiment of the shaft 1.

Figure 7:
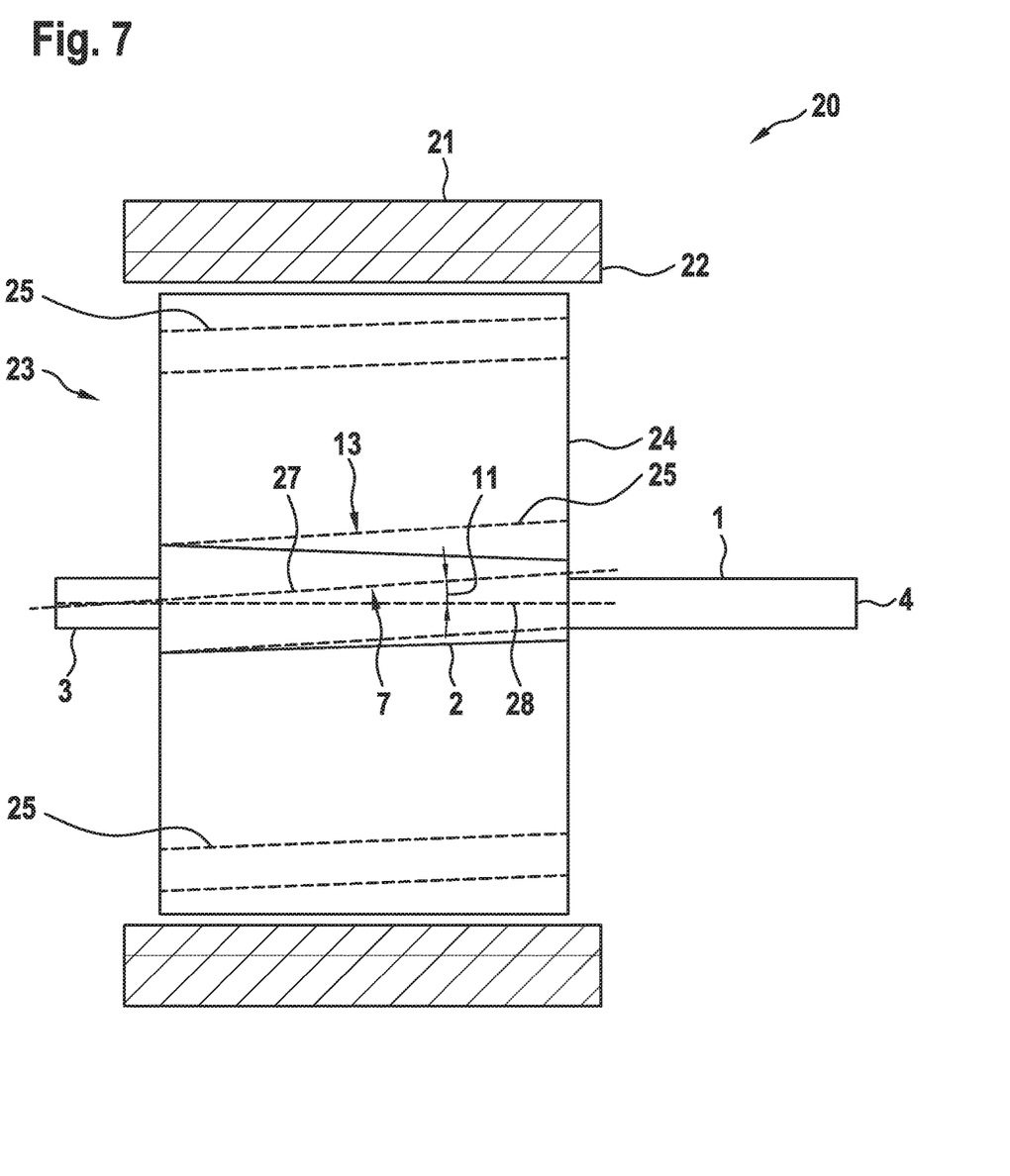
FIG. 7 a basic sketch of a second exemplary embodiment of the electric machine according to the invention with a second exemplary embodiment of the rotor according to the invention.

FIG. 7 is a basic sketch of a second exemplary embodiment of an electric machine 20 which corresponds to the first exemplary embodiment according to FIG. 4, unless otherwise described below. Here, like or functionally like components are provided with identical reference signs.

The electric machine 20 comprises a second exemplary embodiment of a rotor 23, which is designed as a tilted rotor. The laminated core 24 of the rotor 23 is formed by rotor laminations 12 according to the exemplary embodiment in FIG. 3, which each have a constant offset in the circumferential direction in relation to their predecessor. This results in the formation of correspondingly inclined magnet pockets, in which the permanent magnets 25 are arranged. Here, the angle 11 corresponds to an angle of inclination of the rotor 23, which is enclosed by the straight lines 27, 28.

According to a second exemplary embodiment of a method for producing a rotor according to FIG. 7, the through-openings 13 of each rotor lamination 12 are guided over the core seat 2, which may be performed from any end of the core seat 2, i.e. from the end facing the shaft end 3 or the end facing the shaft end 4. This is done by applying an axial force to the rotor laminations 12, with a rotation of each rotor lamination 12 being achieved by the sliding of an inner contour of the through-opening 13 along an outer contour of the core seat 2.

This has the advantage that the rotor laminations 12 orient themselves automatically in the angle of inclination due to the mirror-inverted polygonal profiles, so that the complex pre-threading of the rotor laminations 12 before the actual threading of the rotor laminated core thus formed may be avoided.

The rotor laminations 12 are shrunk onto the shaft 1 in the same way as in the first exemplary embodiment of the method.

In both exemplary embodiments of the electric machine 20, the angle 11, i.e. the stagger angle or the angle of inclination, lies between $360°·(r-1) r^{-1}·Z^{-1}$ and $360°·(r+1) r^{-1}·Z^{-1}$, wherein $r≥2$, in particular $r≥10$, and is a real number. If, for example, the number of stator teeth is $Z=48$, the angle 11 may therefore be $7.5°±3.25°$ or $7.5°±0.75°$.

According to another exemplary embodiment of the shaft, which incidentally corresponds to one of the exemplary embodiments described above, and another exemplary embodiment of the rotor lamination, which incidentally corresponds to the exemplary embodiment according to FIG. 3, the polygonal profile is a P4C profile according to DIN 32712. In this case an inner quadrilateral is inscribed instead of an inner triangle.

According to another exemplary embodiment of the electric machine, which incidentally corresponds to one of the exemplary embodiments described above, the electric machine is a separately excited synchronous machine.

Figure 8:
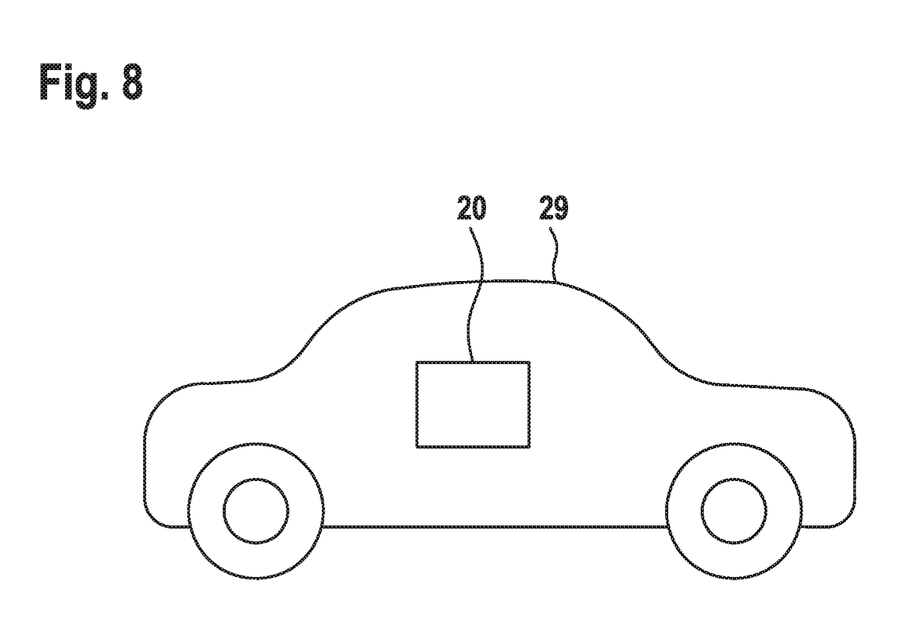
FIG. 8 a basic sketch of an exemplary embodiment of the vehicle according to the invention.

FIG. 8 is a basic sketch of an exemplary embodiment of a vehicle 29 comprising an electric machine 20 according to one of the exemplary embodiments described above. The electric machine 20 is designed to drive the vehicle 29. The vehicle may be an electric vehicle (BEV) or a hybrid vehicle.

The invention claimed is:

1. A shaft for an electric machine, comprising a core seat for a laminated core and two shaft ends extending axially outwardly from the core seat in opposite directions,
   wherein the core seat has two core seat portions separated from each other and offset in a circumferential direction, and extending in an axial direction with a polygonal profile for forming a polygonal connection to the laminated core, and
   the polygonal profile includes a regular inner N-sided shape, with $N≥3$, inscribed in the core seat and located in an outer circle with each corner touching the regular inner N-sided shape and an inner circle concentric with the outer circle, and chords of the inner circle running along a side of the inner N-sided shape.

2. The shaft according to claim 1, wherein a straight line lying on one of the corners in an axial extent of the core seat portions is parallel to a central axis of the shaft.

3. The shaft according to claim 2, wherein a screw curve at the core seat portions touches the corner at a central axial position of the core seat portions form an angle with the straight line.

4. A rotor lamination for an electric machine, having a central through-opening with a polygonal profile,
   wherein the polygonal profile is an inverted shape with respect to the two core seat portions of the shaft of claim 1.

5. A rotor for an electric machine, comprising the shaft according claim 1 and a rotor laminated core formed from stacked rotor laminations, each rotor lamination having a central through-opening with a polygonal profile, wherein the polygonal profile is an inverted shape with respect to the two core seat portions of the shaft, and the central through-openings sit on the core seat.

6. A method for producing the rotor according to claim 5, wherein the through-openings of each rotor lamination are guided over the core seat.

7. An electric machine comprising the rotor according to claim 5 wherein
   the through-openings (13) of each rotor lamination are guided over the core seat, wherein the rotor is rotatably supported within a stator of the electric machine.

8. The electric machine according to claim 7, wherein
   the stator has Z stator teeth and an angle is between $360°·(r-1)r^{-1}·Z^{-1}$ and $360°·(r+1)r^{-1}·Z^{-1}$, wherein $r≥10$, and is a real number.

9. A vehicle comprising the electric machine according to claim 7, which is designed to drive the vehicle.

10. The shaft according to claim 1, wherein the polygonal profile is a P3G profile, or a P4C profile.

11. The shaft according to claim 1, wherein the two core seat portions have a same polygonal profile with a plurality of projections arranged parallel to a center shaft and angularly offset from each other on a periphery of the core seat.

12. The shaft according to claim 1, wherein each of the two core seat portions has three eccentric protuberances extending parallel to a center shaft and curved codes connecting the three eccentric protuberances, and the two core seat portions are connected axially, and angularly displaced along the center shaft such that each of the three eccentric protuberances of one of the two core seat portions is located in a center between two of the three eccentric protuberances of another of the two core seat portions.

* * * * *